United States Patent
Stubenrauch et al.

(10) Patent No.: US 10,767,087 B2
(45) Date of Patent: Sep. 8, 2020

(54) ADHESIVE COMPOSITION

(71) Applicant: Borealis AG, Vienna (AT)

(72) Inventors: Kurt Stubenrauch, St. Georgen an der Gusen (AT); Mark Jeruzal, Schottland (GB); Yi Liu, Engerwitzdorf (AT)

(73) Assignee: BOREALIS AG, Vienna ( * ) Notice: Subject to any disclaimer, the term of this patent is extended or adjusted under 35 U.S.C. 154(b) by 245 days.

(21) Appl. No.: 15/543,615

(22) PCT Filed: Jan. 27, 2016

(86) PCT No.: PCT/EP2016/000139
§ 371 (c)(1),
(2) Date: Jul. 14, 2017

(87) PCT Pub. No.: WO2016/128113
PCT Pub. Date: Aug. 18, 2016

(65) Prior Publication Data
US 2018/0010023 A1 Jan. 11, 2018

(30) Foreign Application Priority Data
Feb. 9, 2015 (EP) .................................... 15000371

(51) Int. Cl.
| | | |
|---|---|---|
| *B32B 27/32* | (2006.01) | |
| *B32B 27/38* | (2006.01) | |
| *C09J 151/06* | (2006.01) | |
| *C08L 63/04* | (2006.01) | |
| *B32B 15/085* | (2006.01) | |
| *B32B 15/092* | (2006.01) | |
| *C09J 163/00* | (2006.01) | |

(52) U.S. Cl.
CPC ............. *C09J 151/06* (2013.01); *B32B 27/32* (2013.01); *B32B 27/38* (2013.01); *C08L 63/04* (2013.01); *B32B 2323/04* (2013.01); *C08F 2500/03* (2013.01); *C08F 2500/05* (2013.01); *C08F 2500/12* (2013.01); *C08L 2203/18* (2013.01); *C08L 2205/05* (2013.01)

(58) Field of Classification Search
None
See application file for complete search history.

(56) References Cited

U.S. PATENT DOCUMENTS

| | | | | |
|---|---|---|---|---|
| 4,082,588 | A | * | 4/1978 | Anderton ................ B29C 63/00 |
| | | | | 156/71 |
| 4,963,418 | A | * | 10/1990 | Isaka ..................... B29C 61/003 |
| | | | | 156/218 |
| 2017/0297302 | A1 | * | 10/2017 | Okimura ................ B32B 27/00 |

FOREIGN PATENT DOCUMENTS

| | | |
|---|---|---|
| EP | 0 721 975 A1 | 7/1996 |
| EP | 1 491 328 A1 | 12/2004 |
| JP | S52 130872 A | 11/1977 |
| JP | 2002053730 A * 2/2002 | ............... C08L 51/06 |
| JP | 2007204630 A * 8/2007 | ................ C08J 5/18 |

OTHER PUBLICATIONS

Machine translation of JP-2002053730-A (no date).*
Machine translation of JP-2007204630-A (no date).*
International Search Report and Written Opinion from PCT/EP2016/000139 dated Apr. 22, 2016.

* cited by examiner

*Primary Examiner* — Michael J Feely
(74) *Attorney, Agent, or Firm* — Fay Sharpe LLP

(57) ABSTRACT

The present invention relates to an adhesive composition comprising a. a polyethylene resin (A) which has been grafted with an acid grafting agent and b. an epoxy resin (B) in an amount of 0.01 to 15 wt. % of the adhesive total composition, wherein the adhesive composition is having a $MFR_5$ of 0.1 to 12 g/10 min. Furthermore, the invention relates to an article, in particular a multilayer pipe, comprising an adhesive layer which comprises said adhesive composition and the use of said adhesive composition for the production of an adhesive layer, in particular of an adhesive layer of a pipe.

17 Claims, 1 Drawing Sheet

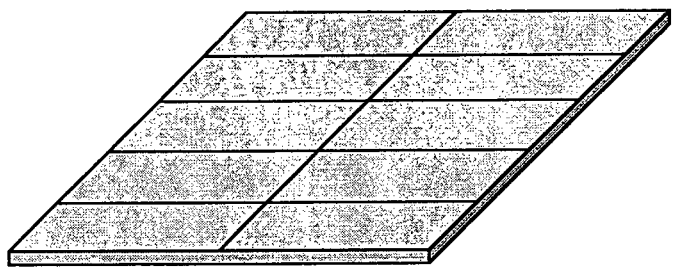
Figure 1: Layout of the aluminium plate and the steel plate.
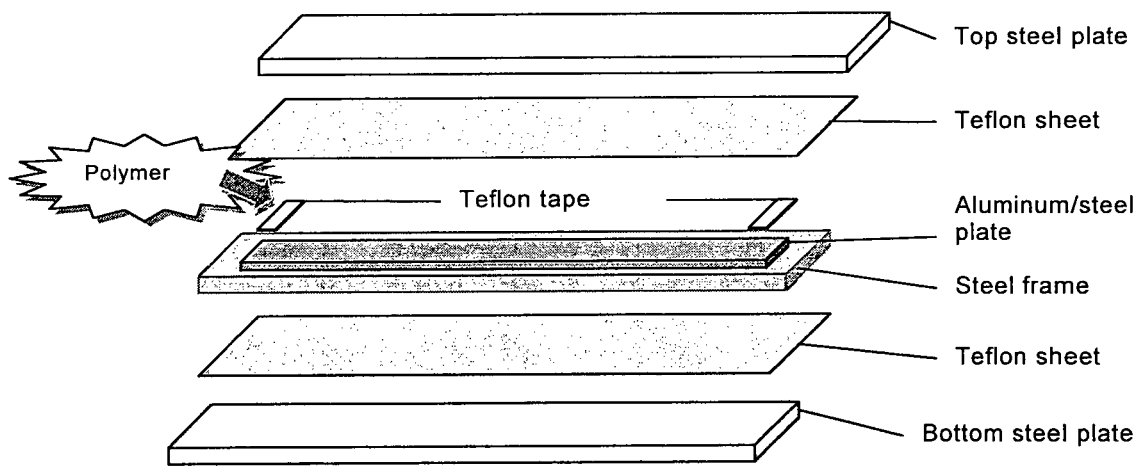
Figure 2: Moulding setup for aluminium and steel plate coating.

ADHESIVE COMPOSITION

This application is a 371 of PCT Patent Application Serial No. PCT/EP2016/000139, filed Jan. 27, 2016, which claims priority to European Patent Application Serial No. 15000371.3, filed Feb. 9, 2015.

The present invention relates to an adhesive composition comprising an acid grafted polyethylene resin as well as an epoxy resin and, to an article comprising a layer of said adhesive composition, in particular a multilayer pipe such as a coated metal pipe, and the use of the adhesive composition for the production of an adhesive layer, in particular an adhesive layer of a multilayer structure of a pipe such as a coated metal pipe.

Multilayer structures comprising two, three, four, five or more layers are known for many applications such as the protective coating of pipes. In these multilayer structures different layers most often consist of different materials which accordingly have different physical and chemical properties. This results in the problem that adjacent layers do not or only to an insufficient extent adhere to each other. Therefore, it is commonly known to build up multilayer structures with intermediate adhesive layers for improving the adhesion of adjacent layers consisting of different materials and thus avoid delamination.

For example, in the coating of metal pipes commonly a three-layer polymer structure is used. It consists of an epoxy layer which is designed to firmly adhere to the outer surface of the metal wall of the pipe, an intermediate adhesive layer and an outer polyolefin protective layer which commonly is a high density polyethylene or polypropylene. The three-layer structure shows improved properties compared to formerly known single-layer coatings. On the one hand, the epoxy layer shows an improved bonding to the metal pipe, avoids cathodic disbondment and provides less oxygen penetration whereas on the other hand the outer polyolefin-based layer provides good mechanical protection, and less water penetration. However, to avoid delamination of the polyolefin layer and the epoxy layer which would result in damage of the multilayer coating an adhesive layer between both layers is necessary.

Adhesive layers and materials for the production of such layers for example are known from WO 99/37730 which discloses an adhesive composition comprising an ethylene copolymer component and from 2 to 35 wt. % of a grafted metallocene polyethylene. EP 1316598 discloses an adhesive polymer composition comprising an acid grafted non-elastomeric polyethylene and elastomer. The composition is used for the preparation of multilayer pipes wherein the adhesive polymer composition acts as an adhesive layer. An adhesive olefin polymer composition and laminate consisting of a metal layer and an adhesive olefin polymer composition layer are described in JP 2011021063. The adhesive olefin polymer composition includes (B) 0.001-3 pts.wt. of a substituted monocyclic or condensed polycyclic aromatic compound or a metal salt thereof and (A) 100 pts.wt. of an olefin polymer containing 0.05-15 wt. % of a graft group composed of an unsaturated carboxylic acid and/or a derivative thereof.

In WO 99/35175 an ethylene homo- or copolymer with a density of between 0.923 and 0.935 $g/cm^3$, having a molecular weight distribution Mw/Mn of between 3 and 10, and comprising from 0.10 to 0.50 wt. % of units derived from a carbonyl group containing compound, based on the total weight of the homo or copolymer, their preparation and use of carbonyl group containing chain transfer agents in this process, and coatability of the ethylene polymer is described.

A process for forming multilayer structures containing a metal layer and an adhesive layer is disclosed in US 20120196138. The adhesive layer comprises an ethylene-$C_4$-$C_8$ alpha-olefin linear low density copolymer, a polymer grafted with an ethylenically unsaturated carboxylic acid or acid derivative and a styrene-butadiene-styrene triblock copolymer having an MI of 5 to 50. In US 20110129667 polyolefin-based adhesive compositions and multilayer structures are disclosed wherein the adhesive composition comprises a first copolymer of 1-butene and propylene; a second copolymer of ethylene and a comonomer selected from 1-butene, 1-hexene or 1-octene, a polyolefin grafted with an ethylenically unsaturated carboxylic acid or derivative and an olefin polymer different for the above polymers.

WO 2010134954 teaches the preparation of polyolefin-based adhesives whereby the adhesive comprises a maleate grafted polyolefin. The maleate grafted polyolefin is let-down in a LLDPE and the let-down LLDPE is selected from those which have a melt index $MI_2$ 0.1-5 dg/min, preferably 1-3 dg/min. The adhesive composition can be used in multilayer polyolefin films and multilayer pipes.

U.S. Pat. No. 6,177,516 is related to adhesives and composite structures formed therewith. The adhesive comprises 35-95% an ethylene copolymer resin with a density of 0.930 $g/cm^3$ or below having hard and soft phases that form a network structure and 5-65% of a modified polyolefin containing acid or acid derivative functionality. The adhesives are useful for the manufacturing of composite structures by lamination, extrusion and coextrusion processes. The ethylene copolymers have a network structure and exhibit unique melt elasticity characteristics in combination. Composite structures wherein the adhesives are adhered to one or more substrates and, particularly composite structures comprising metal or barrier resin layers with one or a plurality of crosslinked or uncrosslinked polyethylene resin layers, are also described.

US 20110129666 relates to an adhesive composition, useful e.g. in a multilayer structure; the described composition comprises a blend comprising e.g. a propylene-based polymer, a polyolefin grafted with an ethylenically unsaturated carboxylic acid or acid derivative and an olefin polymer resin.

For achieving a durable coating it is essential that the applied polymer layer is effectively bonded to the metal pipe. Besides, there is a need that the adhesive polymer can be applied uncomplicatedly and that preferably the number of coating layers can be reduced.

It is the object of the present invention to provide an adhesive composition in particular for use in the production of adhesive layers for mono- and multilayer structures with improved adhesion properties. A further object of the present invention is to provide an adhesive composition that allows the reduction of layers in multilayer structures e.g. coating of surfaces such as metal pipes.

The present invention is based on the finding that this problem can be solved by providing an adhesive composition comprising an acid grafted polyethylene and an epoxy resin.

By that finding a reduction of material input, costs and time can be achieved upon coating of surfaces with inventive compositions.

The present invention therefore provides an adhesive composition which comprises a) a polyethylene resin (A) which has been grafted with an acid grafting agent and
b) an epoxy resin (B) in an amount of 0.1 to 15 wt. % of the adhesive total composition, wherein the adhesive composition is having a MFR$_5$ of 0.01 to 12 g/10 min.

It has been surprisingly found that the inventive adhesive composition shows improved adhesion properties, in particular when used as an adhesive layer. For example, the adhesive composition when applied as adhesive layer in the two-layer structure for coating of metal stripes shows improved performance in a peeling test. The term two-layer structure denotes in this context the metal layer covered with an adhesive layer. The peeling properties are already improved at room temperature.

The peeling test result designates the bonding between the adhesive layer and a metal stripe.

It is believed that the improved adhesive properties are caused by the particular properties of the acid grafted resins in combination with the epoxy resin. Compared to acid grafted polyethylene compositions lacking an epoxy resin inventive compositions show better adhesion properties.

The polyethylene resin (A) of the inventive composition preferably comprises, more preferably consists of, a homopolymer of ethylene. In another embodiment the polyethylene resin (A) of the inventive composition preferably comprises, more preferably consists of, a copolymer of ethylene with one or more unsaturated alpha-olefin comonomer(s). In a further embodiment the polyethylene resin (A) preferably comprises, more preferably consists of, a mixture of a homo- and a copolymer of ethylene. If an ethylene copolymer forms part of resin (A), preferably the alpha-olefin comonomer(s) comprise(s) 3 to 20 carbon atoms, more preferably from 3 to 12 carbon atoms and most preferably from 3 to 8 carbon atoms.

Examples of the alpha-olefin comonomers include, for example, propylene, 1-butene, 1-pentene, 1-hexene, 4-methyl-1-pentene, 1-octene, 1-decene, styrene and mixtures thereof. Particularly preferred comonomers are propylene, 1-butene, 1-hexene, 4-methyl-1-pentene and 1-octene, especially preferred 1-butene and 1-hexene.

The most preferred alpha-olefin comonomer is 1-hexene.

Typically, the amount of comonomer within the copolymer is from 1 to 30 wt. % of the total weight of the copolymer and more preferably is from 1 to 5 wt. % of the total weight of the copolymer.

Further preferred, polyethylene resin (A) of the adhesive composition has a melt flow rate MFR$_2$ of 0.5 to 20 g/10 min, more preferably of 1 to 10 g/10 min, even more preferably 1 to 8 g/10 min, most preferably 1 to 5.

The density of the polyethylene resin (A) usually is in the range of 850 to 970 kg/m$^3$. However, it is preferred that resin (A) has a density of 920 to 970 kg/m$^3$ and still more preferred of 925 to 945 kg/m$^3$.

Resin (A) of the adhesive composition can be produced in a process comprising any single-site catalyst known in the art. It is also possible that resin (A) is produced in a process comprising a mixture of a single-site and another catalyst of the same or different nature. In the case of a mixture of a single-site catalyst and a catalyst of a different nature, it is preferred that at least 90% of resin (A) of the adhesive composition is produced by a single-site catalyst.

Preferably, resin (A) is produced in a process comprising a metallocene catalyst. Further preferred, the catalyst comprises a metallocene component on a porous support and an alumoxane component. Preferred catalyst are those as described in EP 0 678 103, WO 97/28170, WO 98/56831 and/or WO 00/34341. The content of these documents is herein included by reference.

Further preferred, resin (A) is produced in a process as disclosed in EP 0 678 103 which is characterized in that ethylene is polymerized using a supported olefin polymerization catalyst prepared by
(1) providing a porous support, which is an inorganic oxide of an element chosen from groups 2, 13 and 14 of the IUPAC Periodic Table of the Elements,
(2) providing a solution comprising
(2.1) the reaction product of
(2.1.1) a metallocene of the formula (I)

$$(Cp)_m R_n MR'_o X_p \qquad (I)$$

wherein Cp is an unsubstituted or substituted and/or fused homo- or heterocyclopentadienyl, R is a group of 1-4 atoms connecting two Cp rings, M is a transition metal of group 4, 5 or 6, R' is a hydrocarbyl or hydrocarboxyl group having 1-20 carbon atoms, and X is a halogen atom, in which case m=1-3, n=0 or 1, o=0-3, p=0-3 and the sum m+n+p=the same as the state of oxidation of M, and
(2.1.2) an alumoxane of the formula (II)

$$(R''-AlO)_x-AlR''_2 \qquad (II)$$

which formula (II) depicts a linear compound, and/or of the formula (III)

which formula (III) depicts a cyclic compound, and in which formulae (II and III) x is 1-40, preferably 10-20, y is 3-40, preferably 3-20, and R'' is an alkyl group having 1-20 carbon atoms and
(2.2) a solvent, capable of dissolving said reaction product,
(3) impregnating the porous support with a volume of the solution, which does not exceed the total pore volume of the porous support, and
(4) recovering the impregnated porous support, the pores of which are filled with said solution.

The preferred embodiments of the catalyst given in EP 0 678 103 are also preferred for the production of resin (A) of the adhesive composition of the present invention.

Resin (A) can be, and preferably is, a unimodal polyethylene. A unimodal polyethylene preferably is produced in a single-stage polymerization process using a conventional polymerization reactor.

The polyethylene resin (A) may be produced in any suitable polymerization process known in the art, such as slurry, solution and gas phase. Into the polymerization zone is introduced the polymerisation catalyst, ethylene, optionally an inert diluent, and optionally hydrogen and/or comonomer.

The catalyst may be transferred into the polymerization zone by any means known in the art. For example, it is possible to suspend the catalyst in a diluent and maintain it as homogeneous slurry. Alternatively, the catalyst may be mixed with a viscous mixture of grease and oil and feed the resultant paste into the polymerization zone. It is also possible to let the catalyst settle and introduce portions of thus obtained catalyst mud into the polymerization zone.

Slurry

The polyethylene resin (A), may be produced in slurry polymerisation. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons and preferred diluent is propane.

The ethylene content in the fluid phase of the slurry may be from 2 to about 50% by mole, preferably from about 2 to about 20% by mole and in particular from about 3 to about 12% by mole.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art. Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

Gas Phase

The polyethylene resin (A), may be produced in gas phase polymerisation, preferably in a fluidized bed reactor, in a fast fluidized bed reactor or in a settled bed reactor or in any combination of these. The polymerization is more preferably conducted in a fluidized bed gas phase reactor, wherein ethylene is polymerized together with at least one comonomer in the presence of a polymerization catalyst and, preferably in the presence of the reaction mixture from the first polymerization zone comprising the ethylene polymer component (A) in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452.

Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed.

Typically the fluidized bed polymerization reactor is operated at a temperature within the range of from 50 to 100° C., preferably from 65 to 90° C. The pressure is suitably from 10 to 40 bar, preferably from 15 to 30 bar.

Solution

The polyethylene resin (A) may also be produced in solution polymerisation. Then ethylene is polymerised in the presence of the polymerisation catalyst in an inert solvent. Typically ethylene is copolymerised with at least one comonomer, usually selected from the group consisting of alpha-olefins and dienes having from 3 to 12 carbon atoms.

The process is conducted at a temperature which is greater than the melting temperature of the polyethylene resin (A), typically greater than 120° C., such as from 120 to 220° C., preferably from 140 to 200° C. The pressure is typically selected between 1 and 150 bar, such as 15 and 100 bar.

The solvent may be selected from saturated hydrocarbons, such as alkanes and cycloalkanes. Preferably, the solvent is a saturated hydrocarbon, such as an alkane or a cycloalkane, having from 5 to 20 carbon atoms. Examples of suitable solvents are pentanes, hexanes, heptanes, octanes, cyclopentane, cyclohexane, methylcyclohexane, ethylcyclohexane and mixtures thereof.

Hydrogen may be used for controlling the molecular weight of the polymer. Its amount depends on the specific catalyst used in the process as well as the desired molecular weight. In some instances the hydrogen feed can be from 0.001 to 1% by weight of the ethylene feed.

In another embodiment of the invention, resin (A) is a multimodal polyethylene. Further preferred, the multimodal polyethylene is a bimodal polyethylene.

The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilizing reactors coupled in series and using different conditions in each reactor, the different polymer fractions produced in the different reactors will each have their own molecular weight distribution which may considerably differ from one another. The molecular weight distribution curve of the resulting final polymer can be looked at as the superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively. Multimodal polymers can be produced according to several processes which are described e.g. in WO 92/12182, WO 96/18662, WO 98/58001, WO 99/65949 and WO 2008/089978.

The multimodal polyethylene preferably is produced in a multi-stage process in a multi-step reaction sequence such as described in WO 92/12182. In this process, in a first step ethylene is polymerized in a loop reactor in the liquid phase of an inert low-boiling hydrocarbon medium. Then, the reaction mixture after polymerization is discharged from the loop reactor and at least a substantial part of the inert hydrocarbon is separated from the polymer. The polymer is then transferred in a second or further step to one or more gas-phase reactors where the polymerization is continued in the presence of gaseous ethylene. The multimodal polymer produced according to this process has a superior homogeneity with respect to the distribution of the different polymer fractions which cannot be obtained e.g. by a polymer mix.

The catalyst for the production of the polyethylene resin (A) comprises a single-site catalyst, such as e.g. a metallocene catalyst. Preferred single-site catalysts are described in EP 688 794, EP 949 274, WO 95/12622, WO 00/34341 and WO 00/40620. Most preferred is the catalyst as described in WO 95/12622 and its preferred embodiments as described in this document.

The multimodal polyethylene comprises a low molecular weight (LMW) ethylene homo- or copolymer fraction and a high molecular weight (HMW) ethylene homo- or copolymer fraction.

Depending on whether the multimodal ethylene polymer is bimodal or has a higher modality, the LMW and/or HMW fraction may comprise only one fraction each or two or more subfractions. The expression "ethylene homopolymer" as used herein refers to a polyethylene that consists substantially, i.e. at least 99 wt. %, more preferably at least 99.5 wt. % and most preferably at least 99.8 wt. % of ethylene. Especially preferably it consists of ethylene units.

Preferably, the multimodal ethylene polymer is a bimodal polymer consisting of one LMW fraction and one HMW fraction.

It is further preferred that the multimodal ethylene polymer comprises an ethylene polymer fraction selected from (a) a LMW ethylene polymer having a density of 860-970 kg/m$^3$, more preferably from about 900-950 kg/m$^3$, and an MFR$_2$ of 0.1-5000 g/10 min, more preferably of 25-300 g/10 min, and (b) a HMW polymer having a density of 870-945 kg/m$^3$, more preferably of 870-940 kg/m$^3$ and an MFR$_2$ of 0.01-10.0 g/10 min, more preferably of 0.1-3.0 g/10 min.

Thus, the low molecular weight ethylene polymer preferably is a high density type polyethylene (HDPE) and the high molecular weight ethylene polymer is a low density type polyethylene (LDPE) or a linear low density type polyethylene (LLDPE). Preferably, the ethylene polymer comprises both fractions (a) and (b).

At least one fraction of the ethylene polymer preferably is a copolymer which was polymerized with a $C_3$-$C_8$ alpha-olefin, preferably with at least one comonomer selected from the group consisting of propylene, 1-butene, 4-methyl-1-pentene, 1-hexene and 1-octene. Preferably, the amount of comonomer in the ethylene polymer is 0.02-5.0 mol %, more preferably 0.05-2.0 mol %.

Preferably, the HMW fraction is an ethylene copolymer, preferably copolymerized with one of the above-cited comonomers. Further preferred, the LMW fraction of the polyethylene is a homopolymer.

Further, it is preferred that if the polyethylene resin (A) is produced according to the above-described multi-stage process the LMW fraction is produced in the loop reactor and the HMW fraction in the gas-phase reactor.

The properties of the multimodal polyethylene can be adjusted by the ratio of the low molecular fraction and the high molecular fraction in the multimodal polyethylene.

Preferably, the multimodal ethylene polymer comprises 35-55 wt. %, preferably 43-51 wt. % and most preferred 44-50 wt. % of a low molecular weight ethylene polymer component, and 65-45 wt. %, preferably 57-49 wt. % and most preferred 56-50 wt. % of a high molecular weight ethylene polymer component.

Polyethylene resin (A) has been grafted with an acid grafting agent.

By acid grafting agent it is meant a free-radical polymerizable monomer which contains a carboxylic acid group or a derivative thereof.

Preferably, the acid grafting agent is an unsaturated carboxylic acid or a derivative thereof such as anhydrides, esters and salts (both metallic or non-metallic).

Preferably, the unsaturated group is in conjugation with the carboxylic group. Examples of such grafting agents include acrylic acid, methacrylic acid, fumaric acid, maleic acid, nadic acid, citraconic acid, itaconic acid, crotonic acid, and their anhydrides, metal salts, esters amides or imides.

The preferred grafting agents are maleic acid and its derivatives such as maleic anhydride, and in particular maleic anhydride. Grafting can be carried out by any process known in the art such as grafting in a melt without a solvent or in solution or dispersion or in a fluidised bed. Preferably, grafting is performed in a heated extruder or mixer as e.g. described in U.S. Pat. Nos. 3,236,917, 4,639,495, 4,950,541 or U.S. Pat. No. 5,194,509. The contents of these documents are herein included by reference. Preferably, grafting is carried out in a twin screw extruder such as described in U.S. Pat. No. 4,950,541.

Grafting may be carried out in the presence or absence of a radical initiator but is preferably carried out in the presence of a radical initiator such as an organic peroxide, organic perester or organic hydroperoxide.

The amount of said acid grafting agent added to the overall composition before grafting is preferably from 0.01 to 3.0 wt. %, more preferably from 0.03 to 1.5 wt. % of the overall composition.

In a preferred embodiment the adhesive composition further comprises an elastomeric resin (C).

Grafting may be applied either to resin (A) or to a blend of resins (A) and (C). Preferably, grafting is applied to the blend of resins (A) and (C).

It is further preferred that the elastomeric resin (C) comprises an elastomeric copolymer.

The elastomeric resin (C) preferably comprises a copolymer of ethylene. In the inventive adhesive composition elastomeric resin (C) is an elastomeric ethylene copolymer. This may be a hydrocarbon elastomer of ethylene as for example a copolymer of ethylene and one or more alpha-olefins or dienes selected from the group of propylene, 1-butene, 1-pentene, 1-hexene, 1-octene, 4-methyl-1-pentene, 1,4-butadiene, 1,4-hexadiene and norbornadiene. Examples of such elastomers include ethylene propylene rubber, ethylene propylene diene rubber (EPDM) and ethylene propylene norbornadiene rubber.

Further preferred, elastomeric resin (C) comprises a copolymer of ethylene with one or more polar monomer(s). Preferred examples of such elastomers are ethylene-alkylacrylates and ethylene-alkylacetates. Further preferred, the comonomer is having a polar moiety of the formula —O(CO)$C_1$-$C_6$-alkyl or —C(O)—O$C_1$-$C_6$-alkyl.

Particularly preferred elastomers are ethylenevinylacetate (EVA), ethylenemethylacrylate (EMA), ethylenemethylmethacrylate (EMMA), ethylenepropylacrylate and ethylenebutylacrylate (EBA), in particular EBA.

The elastomer of resin (C) may be made by any process known in the art also including processes comprising a single-site catalyst.

It is further preferred that elastomeric resin (C) of the adhesive composition is present in an amount of 0 to 60 wt. %, preferably of 2 to 60 wt. %, more preferably of 10 to 50 wt. %, most preferably of 20 to 40 wt. % of the total composition.

In one embodiment of the invention the elastomeric resin (C) is added to the polyethylene resin (A) prior to the grafting process. Thus, not only polyethylene resin (A) but also elastomeric resin (C) are grafted with the acid grafting agent as described above.

In another embodiment, the elastomeric resin (C) is added to the polyethylene resin (A) after the grafting process so that elastomeric resin (C) is not grafted with the acid grafting agent.

In the adhesive composition resin (B) is an epoxy resin.

Epoxy resins are appreciated as they comprise reactive epoxy groups simplifying a covalent bonding of the adhesive composition to a surface.

Preferably epoxy resin (B) comprises phenyl groups. Such phenyl groups have the additional advantage that they act as scavengers for possible degradation products of organic antioxidants. Without be bonded on the theory it is very likely that the phenyl groups of the epoxy resin will be Friedel-Crafts alkylated. Typically the alkylating groups originate from the organic antioxidants. One example is 2-methyl-1-propene. Accordingly it is preferred that the inventive adhesive composition comprises epoxy resins comprising units derived from a monomer of the formula (IV)

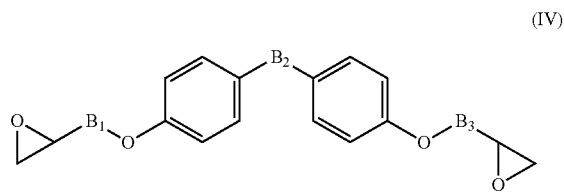

(IV)

wherein $B_1$ and $B_3$ are independently selected from the group consisting of —($CH_2$)—, —($CH_2$)$_2$—, —($CH_2$)$_3$—, —($CH_2$)$_4$—, and —($CH_2$)$_5$—, preferably $B_1$ and $B_3$ are —($CH_2$)—, and $B_2$ is selected from the group consisting of —(($CH_3$)$_2$C)—, —(($CH_3$)$_2$C)$_2$—, —(($CH_3$)$_2$C)$_3$—, —$CH_2$—(($CH_3$)$_2$C)—, —(($CH_3$)$_2$C)—$CH_2$—, —$CH_2$—(($CH_3$)$_2$C)—$CH_2$— and —$CH_2$—(($CH_3$)$_2$C)$_2$—$CH_2$—, preferably $B_2$ is —(($CH_3$)$_2$C)—. Thus, it is appreciated that the epoxy resin (B) comprises units derived from a monomer of the formula (IV-a)

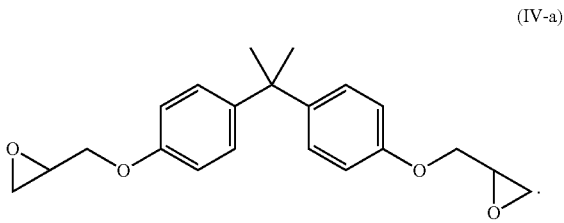 [SMILES: CC(C)(c1ccc(OCC2CO2)cc1)c1ccc(OCC2CO2)cc1]

(IV-a)

Further it is preferred that the epoxy resin (B) comprises not only units derived from a monomer of the formula (IV) or (IV-a) but additionally units derived from a monomer of the formula (V)

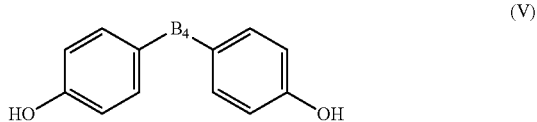
(V)

wherein
$B_4$ is selected from the group consisting of —$((CH_3)_2C)$—, —$((CH_3)_2C)_2$—, —$((CH_3)_2C)_3$—, —$CH_2$—$((CH_3)_2C)$—, —$((CH_2)_2C)$—$CH_2$, —$CH_2$—$((CH_3)_2C)$—$CH_2$— and —$CH_2$—$((CH_3)_2C)_2$—$CH_2$—. Especially preferred are monomers of formula (V), wherein $B_4$ is —$((CH_3)_2C)$—.

Accordingly the epoxy resin (B) has preferably the formula (VI)

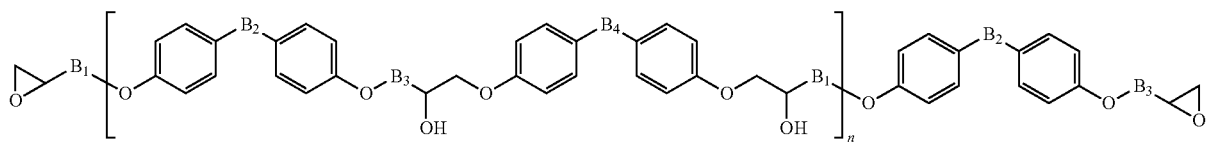
(VI)

wherein
$B_1$ and $B_3$ are independently selected from the group consisting of —$(CH_2)$—, —$(CH_2)_2$—, —$(CH_2)_3$—, —$(CH_2)_4$—, and —$(CH_2)_5$—, $B_2$ and $B_4$ are independently selected from the group consisting of —$((CH_3)_2C)$—, —$((CH_3)_2C)_2$—, —$((CH_3)_2C)_3$—, —$CH_2$—$((CH_3)_2C)$—, —$((CH_3)_2C)$—$CH_2$, —$CH_2$—$((CH_3)_2C)$—$CH_2$— and —$CH_2$—$((CH_3)_2C)_2$—$CH_2$—, and n is from 1 to 20.

The most preferred epoxy resin is poly (2,2-bis[4-(2,3-epoxypropoxyl-phenyl]propane-co-(2-chloromethyl oxirane) (CAS-No 25036-25-3), that is, a Bisphenol A resin.

The epoxy resin (B) used in the adhesive composition preferably has a viscosity at 25° C. (40% in butyl carbitol) of 1 to 1000 mPa*s, more preferably 10 to 750 mPa*s, even more preferably 100 to 500 mPa*s, most preferably 200 to 400 mPa*s.

Further, the epoxy resin (B) used in the adhesive composition preferably has a melt viscosity at 175° C. of 1 to 2000 mPa*s, more preferably 10 to 1000 mPa*s, even more preferably 100 to 750 mPa*s, most preferably 200 to 600 mPa*s.

The epoxy resin (B) used in the adhesive composition preferably has a softening point (Mettler) of 50 to 150° C., more preferably 60 to 135° C., even more preferably 70 to 120° C., most preferably 80 to 105° C.

The epoxy resin (B) used in the adhesive composition preferably has an epoxide index of 1.00 to 2.00 Eq/kg, preferably 1.04 to 1.90 Eq/kg, more preferably 1.08 to 1.80 Eq/kg, most preferably 1.12 to 1.75 Eq/kg.

The epoxy resin (B) used in the adhesive composition has a hydroxyl content of 1 to 8, preferably 1 to 5, more preferably 2 to 4.

The density of the epoxy resin (B) is usually in the range of 800 to 1400 kg/m$^3$. However, it is preferred that epoxy resin (B) has a density of 900 to 1300 kg/m$^3$ and still more preferred of 1000 to 1250 kg/m$^3$.

The epoxy resin (B) used in the adhesive composition preferably does not contain foreign matters in an amount of 0.5 wt. % or above of the total adhesive polymer composition.

It is preferred that the epoxy resin (B) is present in an amount of 0.05 to 20 wt. % of the total adhesive composition, preferably in an amount of 0.1 to 15 wt. % of the total adhesive composition, more preferably in an amount of 0.15 to 10 wt. %, most preferably in an amount of 0.2 to 6 wt. % of the total adhesive composition.

The overall adhesive composition has a melt flow rate $MFR_S$ of 0.01 to 12 g/10 min, preferably 0.05 to 11 g/10 min, more preferably 0.1 to 10 g/10 min, more preferably 0.5 to 9.0 g/10 min, even more preferably 0.7 to 8.0 g/10 min, most preferably 1.0 to 7.0 g/10 min.

The density of the overall adhesive composition usually is from 910 to 990 kg/m$^3$, preferably the density of the overall adhesive composition is from 920 to 970 kg/m$^3$, more preferably from 925 to 955 kg/m$^3$.

The adhesive composition comprises resins (A) and (B) and optionally resin (C) as described above. In addition to these components, conventional additives may also be present in the composition in small amounts preferably up to at most 4 wt. %. For example, an antioxidant may be present in the composition in an amount of at most 10,000 ppm, more preferably at most 5,000 ppm and most preferably at most 3,000 ppm.

It is preferred that the adhesive composition apart from the conventional additives consists of resins (A) and (B) and optionally resin (C), i.e. that no further polymer resins are added.

Conventional additives may be added before or after grafting.

The adhesive composition of this invention is most useful as co-extrudable adhesive, but other applications are not excluded.

The present invention also relates to an article which comprises an adhesive layer comprising the adhesive composition as described above.

Such articles e.g. can be pipes, cables, films, articles made by extrusion processes and articles used in engineering applications. In the latter, the adhesive composition may also be used to provide compatibility between various layers or parts. Preferably, the article is a pipe.

It is preferred that the adhesive layer shows increased strength towards metal, preferably steel, brass, copper or aluminium, more preferably steel or aluminium, most preferably aluminium.

The term "metal" denotes in this context elementary metals as well as alloys.

It is preferred that the adhesive layer in the article is in direct contact with the uncoated outer and/or inner surface of an article.

In another embodiment the adhesive layer in the article is adjacent to a base layer. Base layer denotes a layer which is in direct contact with the uncoated outer and/or inner surface of an article. In case of a multilayer coating the base layer is the first layer applied to the uncoated article, thus, being the base of a multilayer coating.

The present invention can also relate to a multilayer pipe, i.e. a pipe comprising a multilayer coating with two, three, four, five or more layers, which comprises a base layer and an adhesive layer adjacent to the base layer which comprises the inventive adhesive composition as described above.

The present invention can also relate to a coated metal pipe, comprising an adhesive layer which comprises the adhesive composition according to any of the above described embodiments and optionally a polyolefin layer. In particular, the present invention also relates to a metal pipe with two or more layer protective coating consisting of an inner adhesive layer comprising the inventive adhesive composition and an outer polyolefin layer such as a polyethylene or polypropylene layer.

It is preferred that the article is a pipe. Preferably the pipe is coated with the adhesive layer directly at its inner surface and/or outer surface.

In another embodiment the inner and/or outer surface of the pipe is coated with an epoxy layer which is coated with the adhesive layer.

It is preferred that the adhesive layer(s) are coated with surface layer(s) comprising a polyethylene composition.

It is preferred that the pipe is made of metal, preferably steel, brass, copper or aluminium, more preferably steel or aluminium, most preferably aluminium.

Coated steel pipes include the metal structure as a basis. The metal structure usually is coated with an epoxy layer as a protective layer against oxidation. The epoxy layer usually is further coated by an adhesive layer. The standard adhesive layers comprise two components, a non-elastomeric polyethylene and an elastomer, whereby the non-elastomeric polyethylene or both components are grafted with an acid grafting agent such as maleic acid and/or maleic anhydride. The outermost layer or topcoat layer of a coated steel pipe usually comprises a polyethylene, preferably a high density polyethylene composition or a polypropylene composition.

The epoxy layer typically has a thickness of from 70 to 200 micrometer in on-shore installations and a thickness of from 100 to 350 micrometer in off-shore installations. The thickness of the adhesive layer typically is from 200 to 400 micrometer and preferably from 260 to 320 micrometer. The thickness of the outermost coating layer preferably is 2 to 4 mm.

The basic process for coating of steel pipes is well known in the art. Briefly, the pipe surface is cleaned by usual methods such as air and water high pressure washing, grit or shot blasting and mechanical brushing. Also acid wash and chromate pre-treatment are sometimes used. The steel pipe usually is protected by a corrosion protection layer using epoxy resins and organosilicon compounds. Examples of suitable epoxy resins are phenol-based epoxies and amine-based epoxies. These kinds of epoxies are sold, among others, under trade names of AR8434 (of Teknos), Scotch-kote 226N (of 3M) and PE50-7191 (of BASF). Suitable organosilicon compounds have been disclosed in EP-A-1859926.

An epoxy layer usually is placed by heat coating or spray coating. When heat coating is used, the pipes are heated with induction heating up to about 200° C. The temperature depends on the line speed and the material being used in the corrosion preventing layer (C). When the epoxy Teknos AR8434 is used the steel pipe is preferably heated to 190° C. The temperature decreases slightly during the coating process. Alternatively epoxy powder can be sprayed on with epoxy guns at 23° C., whereby the speed of the rotating pipe is about 9 m/min. The thickness of the epoxy and other coating materials are set in accordance with end use specified requirements.

The extrusion of the adhesive layer usually is performed by a single screw extruder. The same holds for the extrusion of the coating composition according to the present invention. Typical extruder geometry are a diameter of, for instance, from 30 to 100 mm, such as 60 mm, and a length of from 15 to 50 UD, such as 30 UD.

Both the adhesive layer and the top coat layer are usually rolled tightly onto the pipe with a silicone pressure roller.

The coating of the steel pipe can be applied at a low pressure in the extruder extruding the coating composition of the top coat layer. At a screw speed of 25 rpm, the process preferably involves an extruder pressure of 88 bar or lower. At a screw speed of 50 rpm, the process preferably involves an extruder pressure of 119 bar or lower. At a screw speed of 150 rpm, the process preferably involves an extruder pressure of 200 bar or lower. These low pressures reflect the low amount of energy needed.

Further the die temperatures can be 230° C. or lower at 25 rpm screw speed, 225° C. or lower at 50 rpm screw speed, and 190° C. or lower at 150 rpm screw speed. The lower die temperatures lead to a more stable coating a reduction of defects and less polymer damage.

The screw speeds can be 120 rpm or higher. These screw speeds lead to a significant increase of the output.

In the present invention the adhesive layer of the coated steel pipe preferably comprises the adhesive composition of the present invention.

The adhesive composition of the present invention shows an improved adhesion to steel so that in certain applications the epoxy layer can be omitted and the adhesive layer comprising the adhesive composition of the present invention can be directly coated on the metal structure of the steel pipe preferably followed by the outermost coating layer coated onto the adhesive layer.

Coated aluminium pipes are usually used for hot and cold water applications and usually comprise five layers, i.e. a oxygen barrier middle layer made of aluminium, two adhesive layers coated onto the inner and outer surface of the oxygen barrier middle layer and an outer and inner surface layer made of polyethylene which are coated onto the two adhesive layers. The polyethylene of the inner and outer surface layer may be cross-linked, utilizing known technology such as thermal, moisture or irradiated cure processes, to enhance physical properties, particularly high temperature and high pressure resistance.

In the present invention the adhesive layers of the coated aluminium pipe preferably comprises the adhesive composition of the present invention.

Furthermore, the present invention relates to the use of the adhesive composition as described above for the preparation of an adhesive layer.

Preferably, the present invention further relates to the use of the adhesive composition for the production of an adhesive layer in an article as e.g. a pipe, a cable, a film, an article made by extrusion coating and articles used in engineering applications. In these latter articles, the adhesive composition may also be used to provide compatibility between various layers or parts.

It is preferred that the present invention also relates to the use of the adhesive composition for the production of an adhesive layer of a pipe. In particular, the present invention also relates to the use of the adhesive composition for the production of an adhesive layer of the coating of a metal pipe with a two- and three-layer protective coating as described above.

FIGURES

FIG. 1 shows the layout of the aluminium plate and the steel plate as used in Examples 3 and 4.

FIG. 2 shows the moulding set up for aluminium and steel plate coating applied for the preparation of the test specimen according to Examples 3 and 4 used for peeling tests according to method 1.k).

EXAMPLES

1. Methods/Definitions a) Melt Flow Rate

The melt flow rate (MFR) was determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene was measured at a temperature 190° C. and a load of 5 kg and the $MFR_2$ of polyethylene at a temperature 190° C. and a load of 2.16 kg.

b) Density of PE Containing Compositions

Density of the polymer was measured according to ISO 1183-1:2004 Method A on compression moulded specimen prepared according to EN ISO 1872-2 (February 2007) and is given in $kg/m^3$.

c) GPC

The weight average molecular weight Mw and the molecular weight distribution (MWD=Mw/Mn wherein Mn is the number average molecular weight and Mw is the weight average molecular weight) were measured by a method based on ISO 16014-4:2003 and ASTM D 6474-99. A Waters GPCV2000 instrument, equipped with refractive index detector and online viscosimeter was used with 2×GMHXL-HT and 1×G7000H columns from Tosoh Bioscience and 1,2,4-trichlorobenzene (TCB, stabilized with 250 mg/L 2,6-Di tert. butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with 15 narrow MWD polystyrene (PS) standards in the range of 1 kg/mol to 12 000 kg/mol. Mark Houwink constants were used for polystyrene and polyethylene (K: $19×10^{-3}$ mL/g and a: 0.655 for PS, and K: $39×10^{-3}$ mL/g and a: 0.725 for PE). All samples were prepared by dissolving 0.5-3.5 mg of polymer in 4 mL (at 140° C.) of stabilized TCB (same as mobile phase) and keeping for max. 3 hours at 160° C. with continuous shaking prior sampling in into the GPC instrument.

d) Measurement Methods Applied for the Epoxy Resin

The epoxide index corresponds to the number of moles of epoxy groups contained in 1 kg of resin and was measured for the epoxy resin according to ISO 3001.

The viscosity of the epoxy resin at 25° C. in 40% butyl carbitol was measured in accordance with ISO 9371.

The melt viscosity at 175° C. of the epoxy resin was measured according to DIN 53108 part 1.

The softening point (Mettler) of the epoxy resin was measured according to DIN 51920.

The hydroxyl content of the epoxy resin was measured according to ISO/DIS 4692.

The density of the epoxy resin (at 20° C.) was measured according to ISO 8130.

k) Peeling Test

The aluminium or steel plates were coated and prepared as described under Examples 3 and 4.

Two parallel stripes, each of 3 mm wide, were milled by robot along the length of a PE coated metal plaque of the dimension 140×50×2 mm (length×width×thickness). The PE tape in the middle of stripes can then be easily carved and peeled off with the aid of the Teflon tape that has been inserted in the coating process. The width of the PE tape was 2 cm.

It was carved until a fixed length of 5 cm.

The peeling test was performed as follows:

a. A prepared specimen was deposited on the top of two moving rolls in the way that the PE coating was in contact with the rolls. The 5 cm carved tape was pulled down between the two moving rolls and tightened with a clamp. The two moving rolls were designed and produced with small diameters which can turn around with the aid of small metal balls. This design helps to minimize the friction between the rolls and the metal support unit during the peel testing and allows gradual horizontal movement of the specimen as the polymer coating is peeled off during measurement.

b. Peeling test was done with a tensile machine, to which a temperature regulated chamber was attached. When the specimen was tested at elevated temperatures, it was conditioned in the chamber at the corresponding temperature for about 30 minutes.

c. During peeling test, the specimen was auto-movable. The experiment was done in the way that the specimen moved upwards with the towing direction. Tensile speed was set at 10 mm/min. If the PE tape was not broken or elongated, one measurement took 8 min. The peeling mode was determined by visually checking the tested specimens after the peeling test.

2. Materials

The following components were used to prepare the examples:

a. PE Composition 1, a maleic acid grafted polyethylene resin containing an elastomeric resin, was prepared according to paragraphs [0074], [0076] and [0078] of EP 1316598 A1.

For the preparation of PE Composition 1 a medium density polyethylene (MDPE) with 1-hexene as a comonomer was produced according to [0074] of EP 1316598 A1. The incorporation of 1-hexene was around 3.3 to 3.5% of the total weight in the medium density polyethylene.

This was followed by grafting of the medium density polyethylene in a Werner & Pfleiderer ZSK 32-mm co-rotating, twin-screw extruder resulting in a composition containing 76.2 parts by weight of the single-site medium density polyethylene, 23 parts by weight of ethylene butyl acrylate elastomer BAR 427 (commercially available from The Dow Chemical Company), 0.5 parts by weight of maleic anhydride, 0.05 parts by weight of peroxide initiator dissolved in 0.45 parts by weight of isododecane and 0.1 parts by weight of antioxidant as stabiliser. The composition was produced according to paragraph [0078] yielding the maleic acid grafted polyethylene resin containing an elastomeric resin (PE Composition 1) having a melt flow rate (190° C./2.16 kg) of 1.2 g/10 min and a density measured according to ISO 1872-2/ISO 1183 of 934 kg/m³.

b. Araldite GT 7072 ES is a solid unmodified epoxy resin based on Bisphenol A with a narrow molecular weight distribution. It has a viscosity at 25° C. of 280-340 mPa*s measured according ISO 9371 and a density at 25° C. of 1190 kg/m³ measure according to ISO 8130. The solid unmodified epoxy resin based on Bisphenol A is commercially available from Huntsman Advanced Materials Europe.

c. BAR 427 is an elastomeric copolymer of ethylene and butyl acrylate containing 27% by weight of acrylate comonomer units and having Vicat softening temperature of 41° C.

d. The Teflon film used in the compression moulding process is 0.24 mm thick. It is commercially available from Kaindl technischer Industriebedarf GmbH.

e. The aluminium plates (EN AW 5005) are commercially available from Schwarzwälder Metallhandel GmbH.

Example 1

1 wt. % of epoxy resin (Araldite GT 7072 ES) was compounded with the PE Composition 1. Compounding was performed on a lab twin screw co-rotating extruder ZSK18 with 7 temperature zones. A temperature profile of 180° C.-200° C.-200° C.-200° C.-200° C.-200° C.-200° C. was applied; the throughput rate was 4 kg/h and the screw speed was 200 rpm.

Example 2

5 wt. % of epoxy resin (Araldite GT 7072 ES) was compounded with the PE Composition 1. Compounding was performed on a lab twin screw co-rotating extruder ZSK18 with 7 temperature zones. A temperature profile of 180° C.-200° C.-200° C.-200° C.-200° C.-200° C.-200° C. was applied; the throughput rate was 4 kg/h and the screw speed was 200 rpm.

Table 1 shows $MFR_5$ and density of PE Composition 1 and Inventive Compositions 1 and 2.

TABLE 1

| | | Material | | |
|---|---|---|---|---|
| Compound | Unit | PE Comp. 1 | Inv. Comp. 1 | Inv. Comp. 2 |
| PE Composition 1 | wt.-% | 100 | 99.0 | 95.0 |
| Araldite GT 7072 ES | wt.-% | 0 | 1.0 | 5.0 |
| MFR₅ | g/10 min | 4.1 | 3.5 | 1.4 |
| Density | Kg/m³ | 934 | 939 | 946 | n.m. = not measurable

Example 3

The aluminium plates were coated with the adhesive compositions according to the following procedure.

An aluminium plate was prepared in the dimension of 280×250×2 mm (length×width×thickness) from which 8-10 aluminium plaques of 140×50×2 mm were cut out later (FIG. 1; Drawings).

The moulding setup was of a sandwich type as shown in FIG. 2.

A steel frame for hosting the aluminium plate of the dimension of 280×250×2 mm (length×width×thickness) on top was placed in the middle of the moulding set up. This steel frame had the outer dimension of 400×400 mm and the inner dimension of 300×300 mm. The aluminium plate was placed on top of this steel frame and two Teflon tapes (about 0.5-1.00 mm thick, dimension 250 mm×20 mm) were placed on top of the aluminium plate. When preparing the peeling specimen the polymeric compositions were applied on top of the aluminium plate and the Teflon tapes. Next below the steel frame and above the polymeric composition on each side a Teflon sheet (about 0.5-1.00 mm thick, dimension 400 mm×400 mm) was applied. This was followed by a bottom steel plate and a top steel plate (3-4 mm thick each) with the square dimension of 400×400 mm forming the outer layers of the moulding set up.

The compositions of Inventive Composition 1 (IC1), Inventive Composition 2 (IC2), and PE Composition 1 were coated onto the aluminium plates following the protocol as described below.

Step 1: Aluminium Plate Cleaning and Preparation

The aluminium plate was cleaned immediately before compression moulding was performed. The aluminium plate was rinsed with Kleen Spray Industrial cleaner (for removal of oil and fat).

Step 2: Melting of PE Resin 220 grams of pellets of the composition of IC1, IC2 or PE Composition 1, respectively, were used per mould. Within the mould frame they were spread on the aluminium plate, on which the two Teflon tapes were placed to facilitate peeling of the polymer strip later. The mould was closed properly from the top with the Teflon sheet and the metal plaque before it was inserted into the press machine (temperature of upper heating block: 195° C.; temperature of lower heating block: 195° C.; melting duration: 10 minutes).

Step 3: Compression-Moulding of the Resins

When the polymer pellets were molten, the gap of two heating blocks was closed with a pressure of 20 bars and this pressure was kept for 5 min.

Step 4: Cooling

The mould was cooled down at a rate of 15° C./min with the aid of a controlled cooling system.

Step 5: Finishing the Aluminium Plate Coating

After the plates were cooled down to room temperature, the resin plaque including the aluminium plates was taken out. The coated aluminium plates were cut out of the 'non-coated' resin. Thereafter 8-10 coated aluminium plaques were cut out from the whole plate.

These specimen were applied for peeling tests as described above.

Table 2 shows the peeling test results. The different peeling modes denote the following kind of peeling:

No adhesion: Peeling occurred between the adhesive layer and the aluminium plate. After peeling, no substance of the adhesive layer was observed on the aluminium plate (peeling mode: AA).

Cohesive peeling: Peeling occurred within the adhesive layer. After peeling some substance of the adhesive layer was left on the aluminium plate (peeling mode: K).

No peeling: The adhesive layer was either elongated or broken during peeling test. This suggests the peeling force was higher than the force needed to yield or break the adhesive material (peeling modes: E and B).

TABLE 2

| | Peeling mode at 23° C. |
|---|---|
| Inventive Composition 1 | K/E |
| Inventive Composition 2 | B |
| PE Composition 1 | AA |

AA: Clean peeling between adhesive layer and aluminium; E: Elongation of the adhesive layer; K: Cohesive peeling between adhesive layer and aluminium; B: Adhesive layer broken.

As can clearly be derived from Table 2 Inventive Compositions 1 and 2 show superior properties in the peeling test compared to PE Composition 1. PE Composition 1 was peeled off without leaving any residue on the aluminium surface whereas Inventive Composition 1 left residue on the surface and was elongated during the peeling test. This indicates an increased adhesion of Inventive Composition 1 to the aluminium surface. Inventive Composition 2 did not show any sign of delamination, that is, no peeling at all was observed, but it broke instead. This demonstrates that the adhesion forces to the surface must be higher than the breaking strength of Inventive Composition 2. Thus, as regards the adhesive properties both Inventive Compositions showed increased adhesion to an aluminium surface.

Example 4

Rust-free steel plates were cleaned by wiping them with sand paper and rinsing them with Kleen Spray Industrial cleaner (for removal of oil and fat) immediately before compression moulding was performed. Then the steel plates were coated with the adhesive compositions according to the procedure described in Example 3.

The obtained specimen were applied for peeling tests as described above.

Table 3 shows the peeling test results whereby the different peeling modes denote the kind of peeling as described in Example 3.

TABLE 3

| | Peeling mode at 23° C. |
|---|---|
| Inventive Composition 1 | K/E |
| Inventive Composition 2 | K/B |
| PE Composition 1 | AA |

AA: Clean peeling between adhesive layer and steel; E: Elongation of the adhesive layer; K: Cohesive peeling between adhesive layer and steel; B: Adhesive layer broken.

From Table 3 can be derived that Inventive Compositions 1 and 2 showed superior properties in the peeling test compared to PE Composition 1. PE Composition 1 was peeled off without leaving any residue on the steel surface whereas Inventive Compositions 1 and 2 left residue on the surface. IC1 was elongated during cohesive peeling during the peeling test whereas IC2 showed breaking during cohesive peeling. Table 3 clearly demonstrates that both Inventive Compositions showed increased adhesion to a steel surface. Besides, the adhesion properties were superior in comparison to PE Composition 1.

The invention claimed is:

1. A pipe comprising an adhesive layer comprising an adhesive composition comprising
   a. a polyethylene resin (A) which has been grafted with an acid grafting agent and
   b. an epoxy resin (B) in an amount of 0.01 to 20 wt. % of the adhesive total composition,
   wherein the adhesive composition has a MFR$_5$ of 0.1 to 12 g/10 min; and wherein the polyethylene resin (A) comprises: a low molecular weight ethylene polymer having a density of 900 to 950 kg/m$^3$ and an MFR$_2$ of 25 to 300 g/10 min; and a high molecular weight polymer having a density of 870 to 940 kg/m$^3$ and an MFR$_2$ of 0.1 to 3.0 g/10 min.

2. The pipe of claim 1, wherein the polyethylene resin (A) comprises 35 to 55 wt. % of the low molecular weight ethylene polymer and 45 to 65 wt. % of the high molecular weight ethylene polymer based on the weight of the polyethylene resin (A).

3. The pipe of claim 1, wherein the polyethylene resin (A) comprises 44 to 50 wt. % of the low molecular weight ethylene polymer and 50 to 56 wt. % of the high molecular weight ethylene polymer based on the weight of the polyethylene resin (A).

4. The pipe according to claim 1, wherein the acid grafting agent is selected from unsaturated carboxylic acids and derivatives thereof.

5. The pipe according to claim 1, wherein the amount of said acid grafting agent is from 0.01 to 3.0 wt. %, of the adhesive composition.

6. The pipe according to claim 1, wherein the epoxy resin (B) is a Bisphenol A resin.

7. The pipe according to claim 1, wherein the epoxy resin (B) is present in an amount of 0.05 to 20 wt. % of the adhesive composition.

8. The pipe of claim 1, wherein the amount of the epoxy resin (B) in the adhesive composition is 0.1 to 15 wt. %.

9. The pipe of claim 1, wherein the amount of the epoxy resin (B) in the adhesive composition is 0.15 to 10 wt. %.

10. The pipe of claim 1, wherein the amount of the epoxy resin (B) in the adhesive composition is 0.2 to 6 wt. %.

11. The pipe according to claim 1, wherein the adhesive composition further comprises an elastomeric resin (C).

12. The pipe according to claim 11 wherein the elastomeric resin (C) is present in an amount of 2 to 60 wt. %, of the total composition.

13. The pipe of claim 11, wherein the amount of the elastomeric resin (C) in the adhesive composition is 10 to 50 wt. %.

14. The pipe of claim 11, wherein the amount of the elastomeric resin (C) in the adhesive composition is 20 to 40 wt. %.

15. The pipe according to claim 1, wherein the adhesive composition has a density of 910 to 990 kg/m$^3$.

16. The pipe according to claim 1, wherein the adhesive layer is coated with at least one surface layer comprising a polyethylene composition.

17. A pipe comprising an adhesive layer comprising an adhesive composition comprising
   a polyethylene resin (A) which has been grafted with an acid grafting agent, the polyethylene resin (A) comprising:
      44 to 50 wt. % based on the weight of the polyethylene resin (A) of a low molecular weight ethylene polymer having a density of 900 to 950 kg/m$^3$ and an MFR$_2$ of 25 to 300 g/10 min; and
      50 to 56 wt. % based on the weight of the polyethylene resin (A) of a high molecular weight ethylene polymer having a density of 870 to 940 kg/m$^3$ and an MFR$_2$ of 0.1 to 3.0 g/10 min;
   0.2 to 6 wt. % of an epoxy resin (B) based on the overall adhesive composition; and
   20 to 40 wt. % of an elastomeric resin (C) based on the overall adhesive composition;
   wherein the adhesive composition has a MFR5 of 0.1 to 12 g/10 min.

* * * * *